(12) United States Patent
Chen et al.

(10) Patent No.: US 12,418,716 B2
(45) Date of Patent: Sep. 16, 2025

(54) HIGHLIGHT MOMENT DETECTION FOR SLOW-MOTION VIDEOS

(71) Applicant: INNOPEAK TECHNOLOGY, INC., Palo Alto, CA (US)

(72) Inventors: Ming Chen, Palo Alto, CA (US); Chiuman Ho, Palo Alto, CA (US)

(73) Assignee: INNOPEAK TECHNOLOGY, INC., Palo Alto, CA (US)

( * ) Notice: Subject to any disclaimer, the term of this patent is extended or adjusted under 35 U.S.C. 154(b) by 249 days.

(21) Appl. No.: 18/352,605

(22) Filed: Jul. 14, 2023

(65) Prior Publication Data
US 2023/0362481 A1    Nov. 9, 2023

Related U.S. Application Data

(63) Continuation of application No. PCT/US2021/016776, filed on Feb. 5, 2021.

(51) Int. Cl.
| | |
|---|---|
| *H04N 23/60* | (2023.01) |
| *G06T 7/20* | (2017.01) |
| *H04N 23/63* | (2023.01) |
| *H04N 23/667* | (2023.01) |
| *H04N 23/68* | (2023.01) |

(52) U.S. Cl.
CPC ............ *H04N 23/64* (2023.01); *G06T 7/20* (2013.01); *H04N 23/635* (2023.01); *H04N 23/667* (2023.01); *H04N 23/6812* (2023.01)

(58) Field of Classification Search
None
See application file for complete search history.

(56) References Cited

U.S. PATENT DOCUMENTS

| | | |
|---|---|---|
| 2010/0265344 A1 | 10/2010 | Velarde et al. |
| 2016/0094801 A1 | 3/2016 | Beysserie et al. |
| 2016/0292510 A1 | 10/2016 | Han et al. |
| 2018/0225941 A1* | 8/2018 | Kim ............. G08B 13/19606 |
| 2020/0134352 A1 | 4/2020 | Choi et al. |

OTHER PUBLICATIONS

Wang et al., "A Marker Locating Method Based on Gray Centroid Algorithm and Its Application to Displacement and Strain Measurement," Fourth International Conference on Intelligent Computation Technology and Automation, Mar. 2011.
WIPO, International Search Report and Written Opinion for PCT/US2021/016776, Oct. 27, 2021.

* cited by examiner

*Primary Examiner* — Paul M Berardesca
(74) *Attorney, Agent, or Firm* — Hodgson Russ LLP

(57) ABSTRACT

Provided are a method for detecting a highlight moment, an electronic device, and a non-transitory computer-readable medium. The electronic device captures a sequence of images of a field of view with a first frame rate, the sequence of images including at least an initiation of the highlight moment. In response to determining, based on at least a gray centroid of a region of interest (ROI) of one image of the sequence of images, that an object appears in the ROI of the sequence of images from the one image, the electronic device determines the one image as an initial image at which the highlight moment is initiated. The electronic device further stores multiple highlight images in association with the highlight moment in the memory of the electronic device. The stored highlight images correspond to the first frame rate.

20 Claims, 10 Drawing Sheets

HIGHLIGHT MOMENT DETECTION FOR SLOW-MOTION VIDEOS

CROSS-REFERENCE OF RELATED APPLICATIONS

This application is a continuation of International Application PCT/US2021/016776, filed Feb. 5, 2021, the entire disclosure of which is incorporated herein by reference.

TECHNICAL FIELD

The present disclosure generally relates to image processing, particularly to methods and systems for automatically detecting and recording highlight moments in a field of view of a video camera for slow-motion playback.

BACKGROUND

Many mobile devices have expanded their video recording capabilities to record slow-motion video content that is often associated with highlight moments, such as water drop falling, balloon popping, and sports events. Such video content is recorded at a high frame rate and played at a low or normal frame rate, thereby allowing a footage corresponding to a highlight moment to be played over an extended duration, i.e., in slow-motion. It is noted that, during image processing, the video content needs to be cached in an expensive dedicated dynamic random-access memory (DRAM) buffer that has a limited space. Given the high frame rate, only a limited duration of video content can be recorded on the DRAM buffer. For example, some DRAM buffers can only store the video content captured at 240 frames per second (FPS) or above for 0.5 seconds.

Recording of the slow-motion video content is often triggered manually or automatically in the mobile devices, and however, can easily miss the limited duration of video content recorded on the buffer. For example, some mobile phones can start recording video content at the high frame rate after a user pushes a "Record" button and record the video content at the high frame rate for a predefined duration. Human reaction has a latency, and the recorded video content often misses the highlight moment in part or entirely. Alternatively, some mobile devices initially records video content at a low frame rate (e.g., 30 FPS). If there is an object moving at a speed higher than a velocity threshold (that is heuristically preset in some situations), video recording at the high frame rate is triggered and lasts for a predefined duration. However, it is often difficult to determine the velocity threshold, and this automatic triggering solution involves large amount of computation and an extended evaluation time (e.g., 20-30 ms for each frame), which could block the entire processing pipeline and miss the highlight moments.

It would be beneficial to have an automatic and ultrafast detection mechanism to detect an initiation of a highlight moment, thereby the highlight moment can be accurately recorded at a high frame rate for slow-motion playback.

SUMMARY

In one aspect, a method for detecting a highlight moment is implemented at an electronic device (e.g., a smart phone having a camera) having one or more processors and a memory. The method includes capturing a sequence of images of a field of view with a first frame rate. The sequence of images includes at least an initiation of the highlight moment. The method further includes: in response to determining, based on at least a gray centroid of a region of interest (ROI) of one image of the sequence of images, that an object appears in the ROI of the sequence of images from the one image, determining the one image as an initial image at which the highlight moment is initiated. The method further includes: storing a plurality of highlight images in association with the highlight moment in the memory. The plurality of highlight images include the initial image and correspond to the first frame rate. In some embodiments, the plurality of highlight images are played back at a second frame rate that is slower than the first frame rate, such that the highlight moment is reviewed in slow motion.

According to another aspect of the present disclosure, an electronic device includes one or more processing units, a memory and a plurality of programs stored in the memory. The programs, when executed by the one or more processing units, cause the electronic device to: capture a sequence of images of a field of view at a first frame rate, the sequence of images comprising at least an initiation of a highlight moment, and the first frame rate exceeding a threshold frame rate; in response to determining, based on at least a gray centroid of a region of interest (ROI) of one image of the sequence of images, that an object appears in the ROI of the sequence of images from the one image, determine the one image as an initial image of a highlight moment; and store, in the memory, a plurality of highlight images in association with the highlight moment, where the plurality of highlight images correspond to the first frame rate.

According to another aspect of the present disclosure, a non-transitory computer readable storage medium stores a plurality of programs for execution by an electronic device having one or more processing units. The programs, when executed by the one or more processing units, cause the electronic device to: capture a sequence of images of a field of view at a first frame rate, the sequence of images comprising at least an initiation of a highlight moment, and the first frame rate exceeding a normal frame rate at which a video chip is recorded and reviewed; in response to determining, based on at least a gray centroid of a region of interest (ROI) of one image of the sequence of images, that an object appears in the ROI of the sequence of images from the one image, determine the one image as an initial image of a highlight moment; and store, in a memory, a plurality of highlight images in association with the highlight moment, wherein the plurality of highlight images include the initial image and are captured at the first frame rate.

Other features and aspects of the disclosed features will become apparent from the following detailed description, taken in conjunction with the accompanying drawings, which illustrate, by way of example, the features in accordance with embodiments of the disclosure. The summary is not intended to limit the scope of any embodiments described herein.

BRIEF DESCRIPTION OF DRAWINGS

The accompanying drawings, which are included to provide a further understanding of the embodiments and are incorporated herein and constitute a part of the specification, illustrate the described embodiments and together with the description serve to explain the underlying principles.

Like reference numerals refer to corresponding parts throughout the several views of the drawings.

DETAILED DESCRIPTION

Reference will now be made in detail to specific embodiments, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of claims and the subject matter may be practiced without these specific details. For example, it will be apparent to one of ordinary skill in the art that the subject matter presented herein can be implemented on many types of electronic devices with digital video capabilities.

This disclosure is directed to detecting a highlight moment that occurs in a predefined region of interest (ROI) (e.g., enters the ROI or first appears in the ROI) in a field of view of a camera of an electronic device. In some implementations, the ROI is predefined by default in the electronic device. The ROI may be defined or adjusted by a user action on the electronic device. In a slow-motion mode, upon detecting a highlight moment within this ROI, the electronic device starts recording a plurality of highlight images at a high frame rate (e.g., larger than 25 FPS). The plurality of highlight images constitute a slow-motion video clip in which motion as recorded appear to be slower than a real situation when the video clip is reviewed at a normal frame rate. In various embodiments of this disclosure, a plurality of spatial regions of different sizes are defined in each image frame to monitor whether there is moving objects appearing in or approaching the ROI, and a plurality of time windows are also used to combine subsets of images captured by the camera to adaptively detect various highlight moments that occur at different speeds. By these means, the highlight moment is detected and recorded locally at the electronic device, in a timely manner (e.g., between two consecutive image frames captured with the high frame rate), and without using complicated algorithms (e.g., a deep learning technique).

Figure 1A:
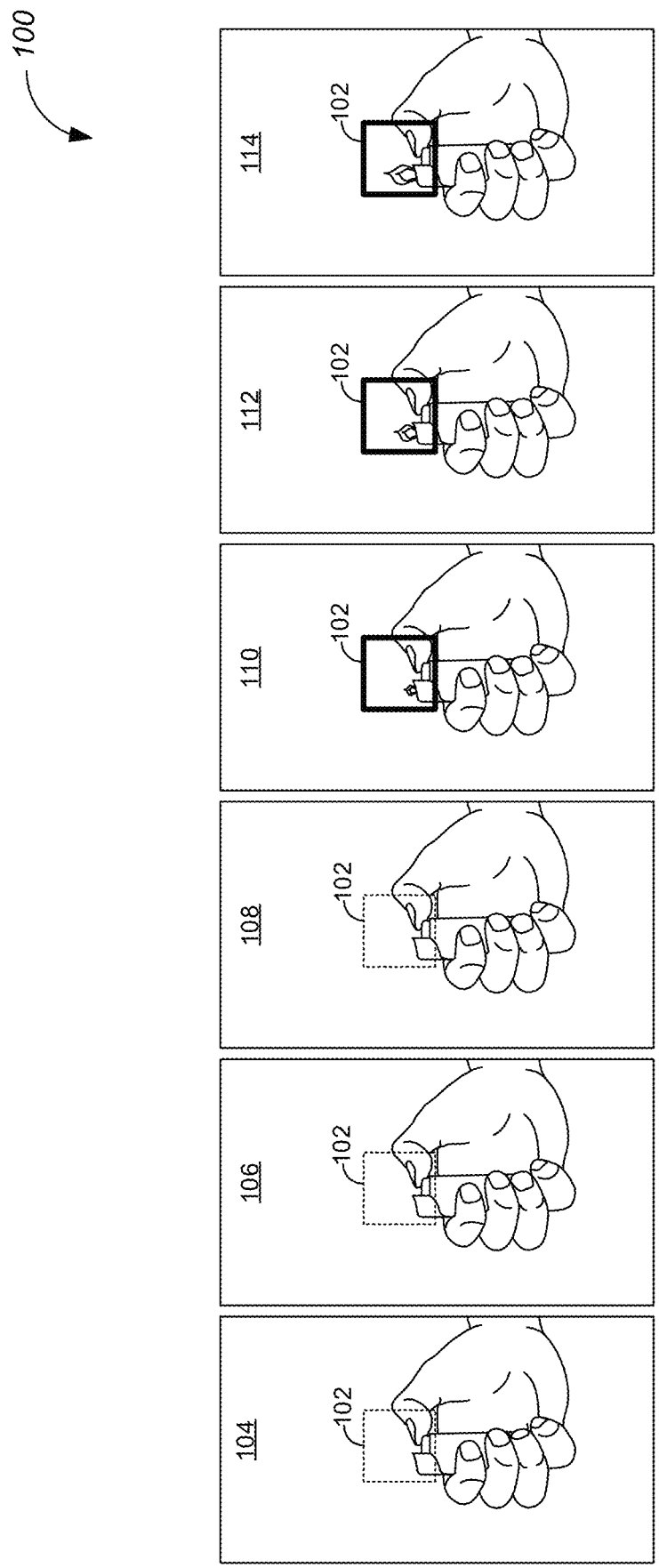
FIG. 1A is a sequence of image frames captured in association with a first example highlight moment of lighting a lighter in an ROI, in accordance with some embodiments.
Figure 1B:
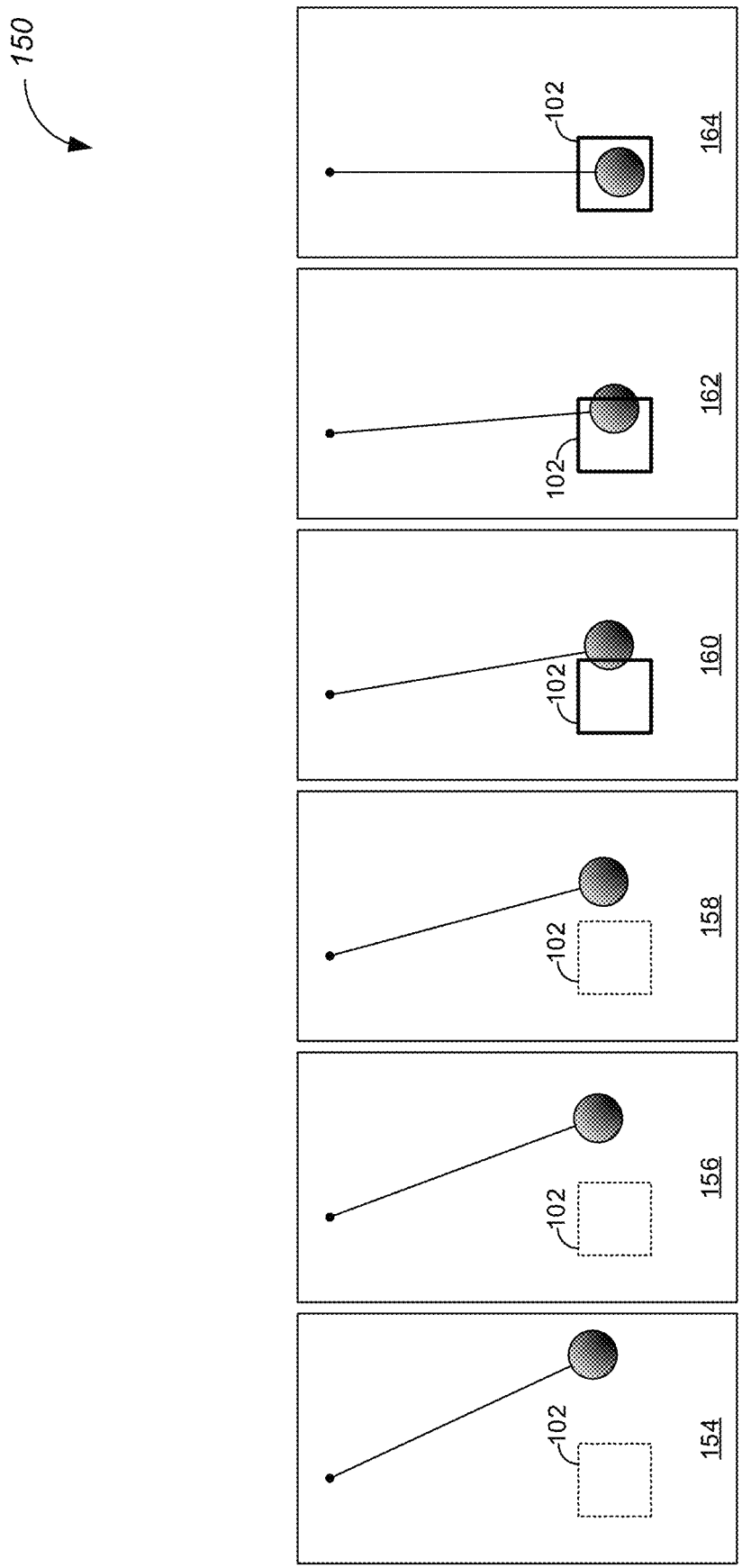
FIG. 1B is a sequence of image frames captured in association with a second example highlight moment of an object entering an ROI, in accordance with some embodiments.

FIG. 1A is a sequence of image frames 100 captured in association with a first example highlight moment of lighting a lighter in an ROI 102, in accordance with some embodiments, and FIG. 1B is a sequence of image frames 150 captured in association with a second example highlight moment of an object entering an ROI 102, in accordance with some embodiments. Before a static or video image is captured, a field of view of a camera of an electronic device is observed via an optical viewfinder of the camera or displayed on a screen of the electronic device. The ROI 102 is marked in the optical viewfinder or on the screen of the electronic device. In some embodiments, the ROI 102 is predefined for the electronic device. In some embodiments, the ROI 102 is defined or adjusted by a user of the electronic device. For example, the screen of the electronic device includes a touch screen on which user actions (e.g., clicks, swipes and strokes) are received to define or adjust a position, shape and size of the ROI 102. The highlight moments are detected with respect to the ROI 102 in the field of view of the camera. In some embodiments, the highlight moments are classified into two categories corresponding to a first type of incidents that appear/initiate at least partially within the ROI 102 (FIG. 1A) and a second type of incidents in which an object enters the ROI 102 (FIG. 1B).

Recording in a slow-motion mode is triggered by one or more user actions and according to an operation sequence. In some embodiments, a user enables the slow-motion mode by selecting it from a plurality of camera modes (e.g., a time-lapse mode, a normal video mode, a normal photo mode, a square picture mode, a panoramic mode, a portrait mode). After the slow-motion mode is selected, a fixed or adjustable ROI is marked on a viewfinder interface displaying the field of view of the electronic device. When the user continues to initiate a recording session, e.g., by clicking a "Record" button, the electronic device starts to capture image frames at a first frame rate (all called a high frame rate $f_H$). In an example, the first frame rate exceeds a threshold frame rate (e.g., 50 PFS) and a normal frame rate at which video chips are normally recorded and reviewed (e.g., 24 PFS). The image frames are temporarily stored in a cache or buffer (e.g., a buffer 228 in FIG. 2). Upon detecting an initiation of a highlight moment with reference to the ROI, the electronic device starts to record a sequence of image frames (i.e., a plurality of highlight images) starting at or near the initiation of the highlight moment. The sequence of image frames associated with the highlight moment is then stored in memory of the electronic device for subsequent review at a second frame rate (e.g., 25 PFS) that is smaller than the first frame rate.

Referring to FIG. 1A, after a recording session is initiated, six image frames 104-114 are consecutively captured at the first frame rate to identify the highlight moment of lighting the lighter. A right thumb of a hand moves slightly to flick the lighter, and no flame is observed in the first three image frames 104, 106 and 108. A flame shows up in a fourth image frame 110, gradually grows, and stabilizes in a sixth image frame 114. The fourth image frame 110 is associated with an initiation of the first highlight moment of lighting the lighter in the ROI 102. The first highlight moment of lighting the lighter is then associated with a subset of the image frames 104-114 based on a position of the fourth image frame 110 associated with the initiation of the first highlight moment. For example, in different embodiments, the subset of the image frames includes the image frames 110-114 starting from the fourth image frame 110 in which the flame is initially detected, the image frames 106-114 starting from the image frame 106 that precedes the fourth image frame 110, or the image frames 112-114 starting from the image frame 112 that follows the fourth image frame 110. The subset of the image frames are recorded as highlight images associated with the first highlight moment and stored in memory (e.g., data storage 230 in FIG. 2) of the electronic device, while the image frames 104-114 stored temporarily in a buffer can be purged or overwritten for creating more buffer space for recording other image frames in the slow-motion mode.

Referring to FIG. 1B, after a recording session is initiated, six image frames 154-164 are consecutively captured at the first frame rate to record the highlight moment of the object (e.g., a ball of a pendulum) entering the ROI 102. The object is approaching the ROI 102 during the first three image frames 154, 156, and 158. The object is captured to enter the ROI 102 initially in the fourth image frame 160, continues to move into the ROI 102 in the fifth image frame 162, and is entirely enclosed in the ROI 102 in the sixth image frame 164. The fourth image frame 160 is associated with an initiation of the second highlight moment of the object entering the ROI 102. The second highlight moment is then associated with a subset of the image frames 154-164 based on a position of the fourth image frame 160 associated with the initiation of the second highlight moment. For example, in different embodiments, the subset of the image frames includes the image frames 160-164 starting from the fourth image frame 160 in which the object is initially detected, the image frames 158-164 starting from the image frame 158 that precedes the fourth image frame 160, or the image frames 162-164 starting from the image frame 162 that follows the fourth image frame 160. The subset of the image frames are recorded as highlight images associated with the second highlight moment and stored in memory (e.g., data storage 230 in FIG. 2) of the electronic device, while the image frames 154-164 stored temporarily in the buffer can be purged or overwritten.

In some embodiments not shown in FIG. 1A and FIG. 1B, a termination of the first highlight moment is detected in a final image frame when the flame starts to disappear in the ROI 102 of the sequence of images 100, and a termination of the second highlight moment is detected in another final image frame when the object starts to stay entirely out of the ROI 102 of the sequence of images 150. In some implementations, the subset of the image frames that is associated with the first or second highlight moment and stored in the memory includes a predefined number of image frames starting from the image frame 110 or 160 in which the flame or object is initially detected. In some implementations, the subset of the image frames does not include a predefined number of image frames and dynamically ends with the corresponding final image frame or another image frame near the corresponding final image frame.

Figure 2:
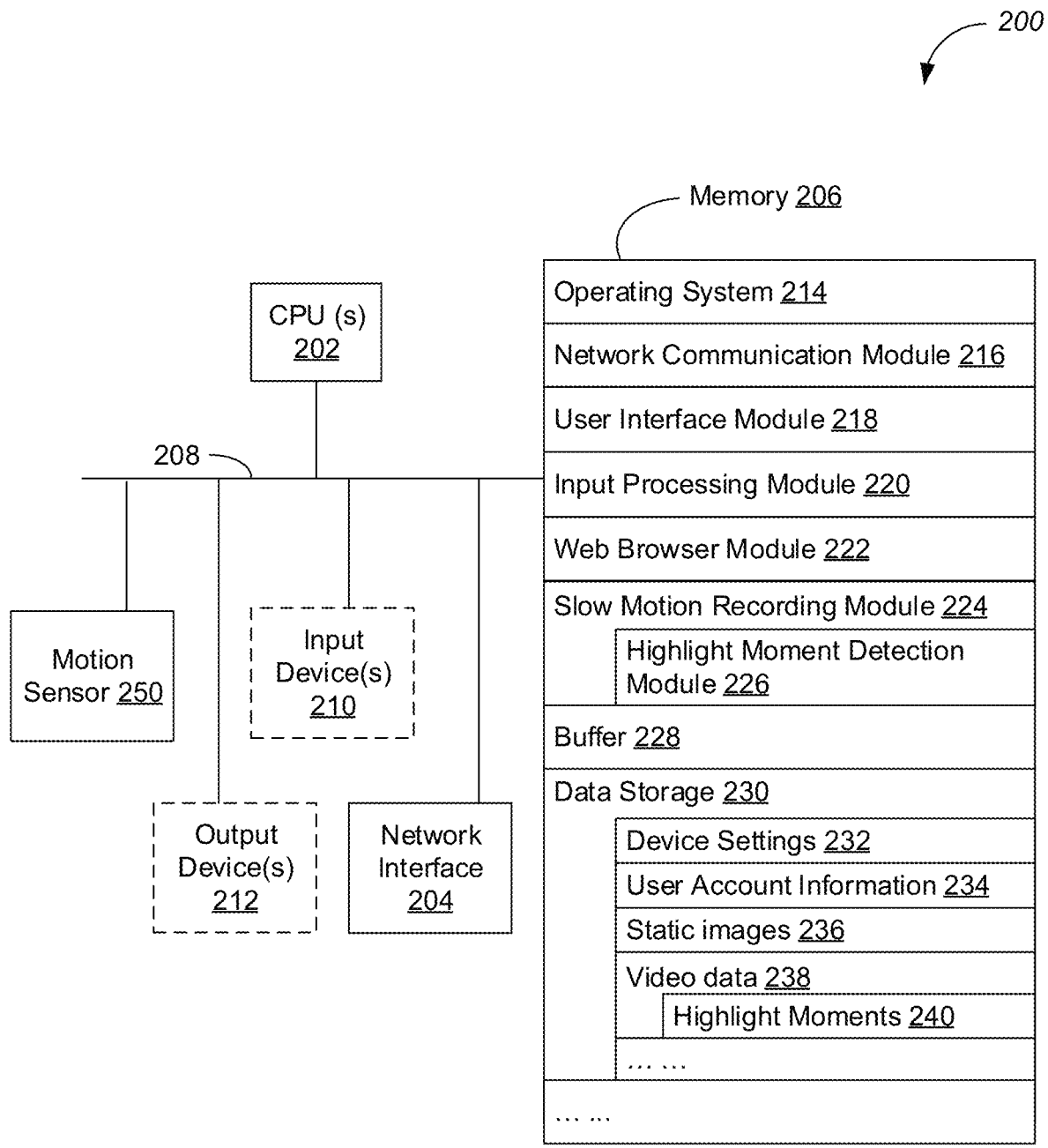
FIG. 2 is a block diagram of an example electronic device (e.g., a mobile phone having a camera) configured to detect a highlight moment to be recorded in a slow-motion mode, in accordance with some embodiments.

FIG. 2 is a block diagram of an example electronic device 200 (e.g., a mobile phone having a camera) configured to detect a highlight moment to be recorded in a slow-motion mode, in accordance with some embodiments. The electronic device 200, generally, includes one or more processing units (CPUs) 202, one or more network interfaces 204, a memory 206, and one or more communication buses 208 for interconnecting these components (sometimes called a chipset). The electronic device 200 could include one or more input devices 210 that facilitate user input, such as a keyboard, a mouse, a voice-command input unit or microphone, a touch screen display, a touch-sensitive input pad, a gesture capturing camera, or other input buttons or controls. In some implementations, the electronic device 200 includes one or more cameras, scanners, or photo sensor units for capturing images, for example, of graphic series codes printed on the electronic devices. Furthermore, the electronic device 200 could use a microphone for voice recognition or a camera for gesture recognition to supplement or replace the keyboard. The electronic device 200 could also include one or more output devices 212 that enable presentation of user interfaces and display content, including one or more speakers and/or one or more visual displays.

The memory 206 includes high-speed random access memory, such as DRAM, SRAM, DDR RAM, or other random access solid state memory devices; and, in some implementations, the memory 206 includes non-volatile memory, such as one or more magnetic disk storage devices, one or more optical disk storage devices, one or more flash memory devices, or one or more other non-volatile solid state storage devices. The memory 206, in some implementations, includes one or more storage devices remotely located from one or more processing units 202. The memory 206, or alternatively the non-volatile memory within memory 206, includes a non-transitory computer readable storage medium. In some implementations, the memory 206, or the non-transitory computer readable storage medium of memory 206, stores the following programs, modules, and data structures, or a subset or superset thereof:

- Operating system 214 including procedures for handling various basic system services and for performing hardware dependent tasks;
- Network communication module 216 for connecting the electronic device 200 to other devices (e.g., various servers, other electronic devices, or storage) via one or more network interfaces 204 (wired or wireless) and one or more networks, such as the Internet, other wide area networks, local area networks, metropolitan area networks, and so on;
- User interface module 218 for enabling presentation of information (e.g., a graphical user interface for presenting application(s), widgets, websites and web pages thereof, and/or games, audio and/or video content, text, etc.) at the electronic device 200 via one or more output devices 212 (e.g., displays, speakers, etc.);
- Input processing module 220 for detecting one or more user inputs or interactions from one of the one or more input devices 210 and interpreting the detected input or interaction, where in some embodiments, the input processing module 220 is configured to determine an ROI 102, in which a highlight moment is detected, based on an user action on the one or more input devices 210;
- Web browser module 222 for navigating, requesting (e.g., via HTTP), and displaying websites and web pages thereof;
- Slow-motion recording module 224 for detecting an initiation of a highlight moment while capturing a sequence of images at a first frame rate that is greater than a threshold frame rate and storing one or more highlight images associated with the highlight moment, where the slow-motion recording module 224 further includes a highlight moment detection module 226 configured to detect the initiation of the highlight moment based on at least a gray centroid of an ROI of one of the sequence of images;
- Buffer 228 for temporarily storing a sequence of image frames in which an initiation of a highlight moment is detected before one or more highlight images are stored locally in a data storage 230 for review in slow motion; and Data storage 230 for storing data on the electronic device 200, where the data is intended to be store permanently in the data storage 230 if no instruction is received to erase or modify the data in some embodiments, and includes one or more of:

Device settings 232 including common device settings (e.g., service tier, device model, storage capacity, processing capabilities, communication capabilities, etc.) of the electronic device 200;

User account information 234 for storing (1) account settings of one or more user accounts managed by the electronic device 200, (2) settings of applications that are associated with the user accounts, and (3) data that are generated by various applications that are associated with the user accounts;

Static images 236 captured and stored by the electronic device 200; and

Video data 238 captured and stored by the electronic device 200, including video data recorded captured in a plurality of camera modes (e.g., a time-lapse mode, a normal video mode, a slow-motion mode), wherein the video data 238 include highlight images associated with a plurality of highlight moments 240.

In an example, the buffer 228 is made of dynamic random-access memory (DRAM), and the data storage 230 is made of non-volatile memory. The buffer 228 has a smaller capacity than the data storage 230, and however, has a faster access rate than the data storage 230. Each of the above identified elements may be stored in one or more of the previously mentioned memory devices and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, the memory 206, in some implementations, stores a subset of the modules and data structures identified above. Furthermore, memory 206, in some implementations, stores additional modules and data structures not described above.

Figure 3:
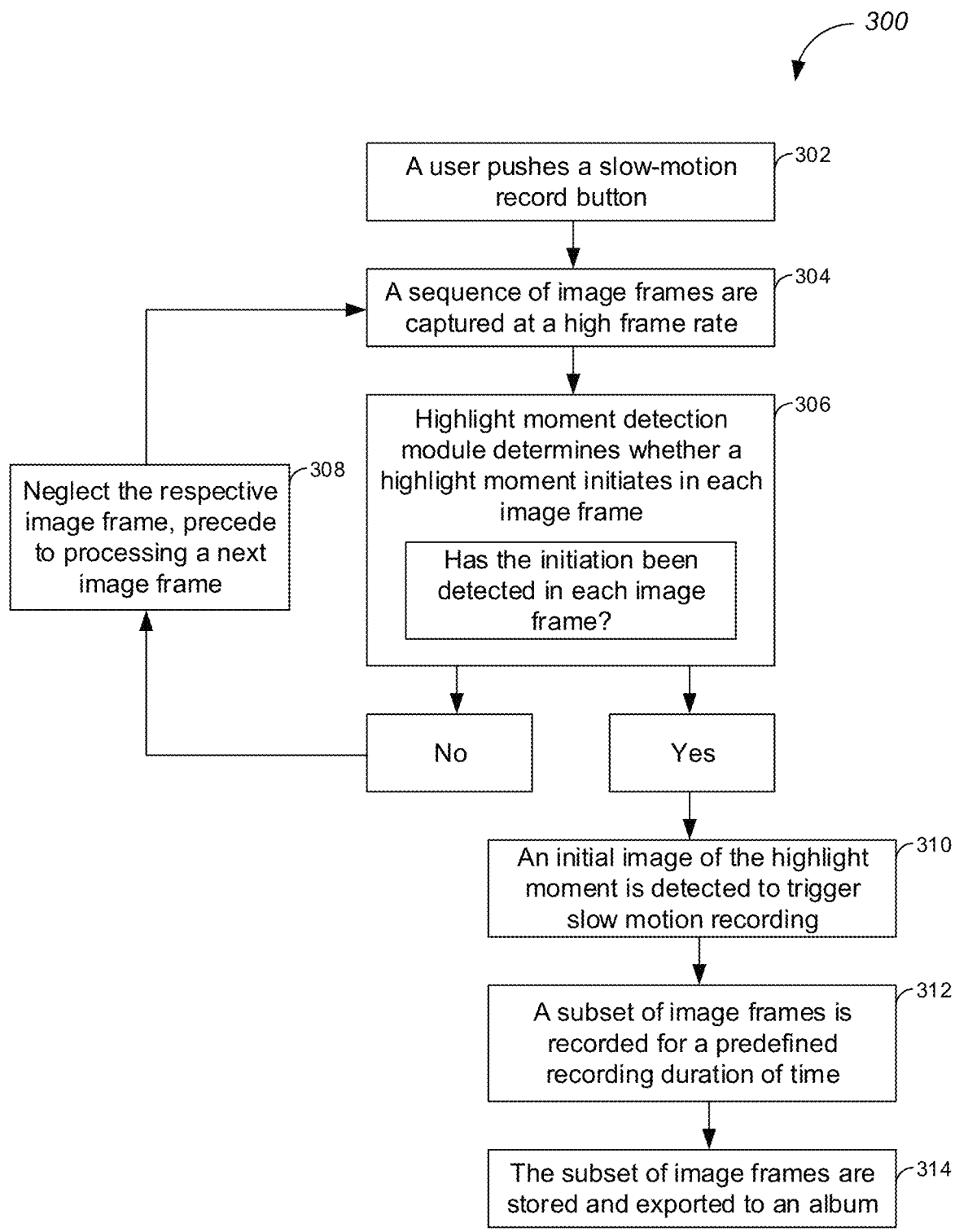
FIG. 3 is a flow diagram of an example process of detecting a highlight moment to be recorded in a slow-motion mode, in accordance with some embodiments.

FIG. 3 is a flow diagram of an example process 300 of detecting a highlight moment to be recorded in a slow-motion mode, in accordance with some embodiments. The process 300 is an ultrafast and automatic pipeline of using highlight moment detection for recording slow-motion video content. A user pushes (302) a "Record" button for slow-motion recording (e.g., selects a slow-motion mode and clicks on a "Record" button in the slow-motion mode). A high frame rate video monitoring module (i.e., the slow-motion recording module 224 in FIG. 2) is evoked to capture (304) a sequence of image frames at a high frame rate. This high frame rate is greater than a normal frame rate (e.g., 24 FPS) at which a normal video clip is recorded and played.

For each image frame in the sequence of image frames, the highlight moment detection module 226 determines (306) whether a highlight moment initiates in the respective image frame. If there is no highlight moment detected to initiate in the respective image frame, the highlight moment detection module 226 neglects (308) the respective image frame and precedes to processing a next image frame that immediately follows the respective image frame in the sequence of image frames. Conversely, if the highlight moment is detected to initiate in the respective image frame, the respective image frame is identified (310) as an initial image frame in which the highlight moment initiates, and the respective image frame and the following frames may be recorded (310) in association with the highlight moment.

In some embodiments, image frames following the initial image frame are recorded (312) until a predefined recording duration of time is reached. Alternatively, in some embodiments not shown, the highlight moment is detected to end in a final image frame, and the image frames following the initial image frame are recorded until the final image frame is detected in the sequence of image frames.

The highlight moment detection module 226 can process each image frame at an ultrafast speed (e.g., within a temporal separation (also called a frame time) between two consecutive image frames in the sequence of image frames). Stated another way, the highlight moment detection module 226 can evaluate every image frame and decide whether to trigger slow-motion video recording before the next frame comes in without blocking the pipeline of the process 300. Accordingly, the process 300 can automatically determine an initiation of a highlight moment and trigger slow-motion video recording in which a subset of image frames related to the highlight moments (i.e., a plurality of highlight images) are stored (314) in the data storage 230 of the electronic device 200, e.g., in an album stored in the memory 206.

Figure 4:
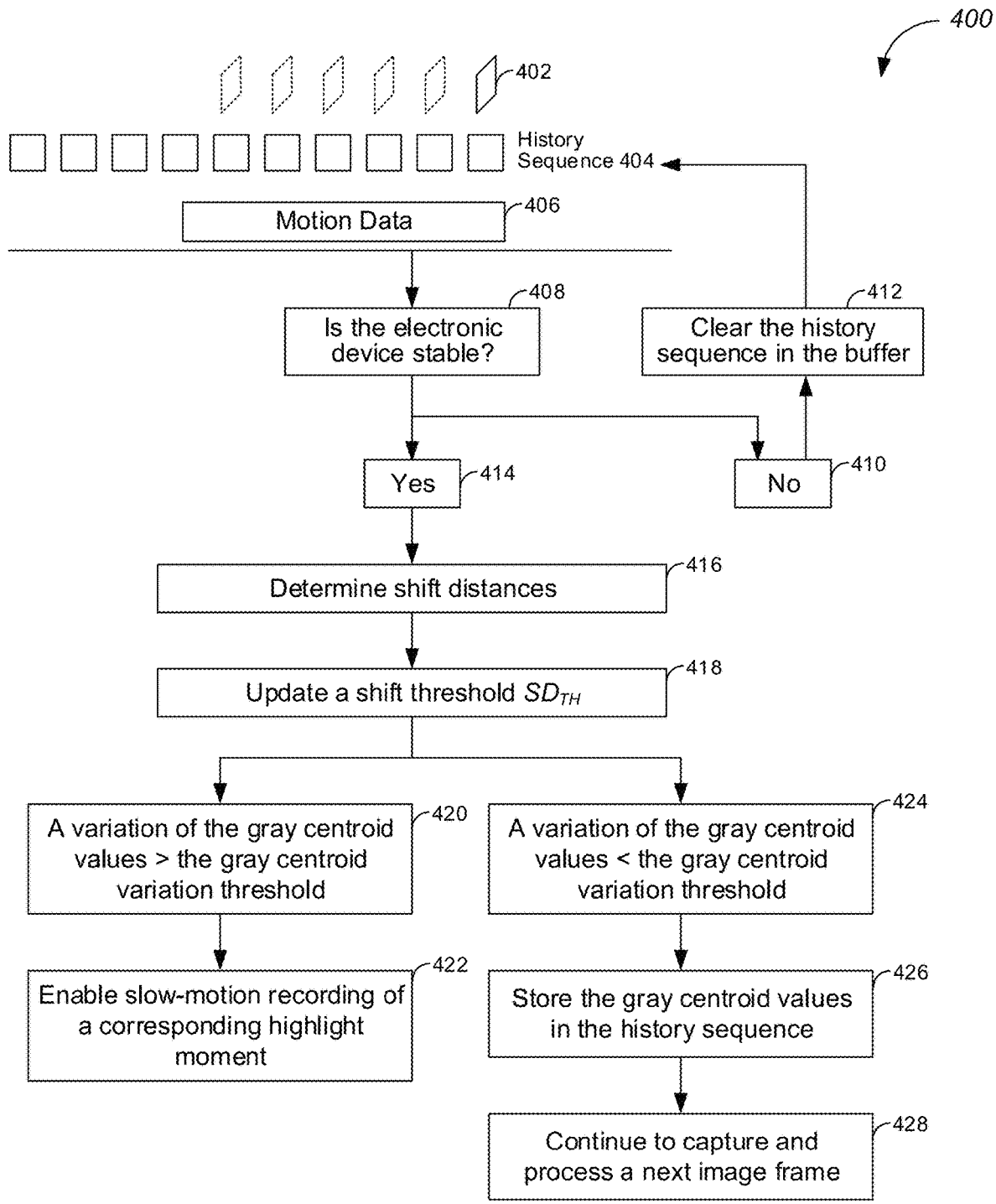
FIG. 4 is a flow diagram of another example process of detecting a highlight moment based on a gray centroid of each image frame in a sequence of image frames, in accordance with some embodiments.

FIG. 4 is a flow diagram of another example process 400 of detecting a highlight moment based on a gray centroid of each image frame in a sequence of image frames, in accordance with some embodiments. The process 400 is implemented by a highlight moment detection module 226 in an electronic device 200. A high frame rate video monitoring module (i.e., the slow-motion recording module 224 in FIG. 2) is configured to capture a sequence of image frames at a high frame rate. The sequence of image frames includes a current image frame 402 and one or more preceding image frames captured immediately prior to the current image frame 402. Each image frame corresponds to gray centroid values and shift distances that are determined based on gray centroids of a plurality of regions in the respective image frame and/or image frame(s) captured prior to the respective image frame.

The buffer 228 stores information of a subset of image frames. The subset of image frames includes the current image frame 402 and a predefined number of preceding image frames that are captured immediately prior to the current image frame 402. The information stored in the buffer 228 includes the current image frame 402 itself and a history sequence 404. In some embodiments, the history sequence 404 includes information of the current image frame 402 and the predefined number of preceding image frames (e.g., their gray centroid values or shift distances). Under some circumstances, at the time of capturing the current image frame 402, the information of the oldest image frame may be purged or overwritten in the buffer 228 before the information of the current image frame 402 is stored in the buffer 228. Unlike the current image frame 402, the information of the predefined number of preceding image frames are stored in the history sequence 404 of the buffer 228 without the corresponding image frames themselves.

Further, in some embodiments, the information stored in the buffer 228 includes one or more preceding image frames of the current image frame 402 in addition to the current image frame 402 and the history sequence 404. Like the current image frame 402, the one or more preceding image frames are stored in the buffer 228 with their gray centroid values or shift distances. In some situations, the oldest preceding image frame stored in the buffer 228 may be purged or overwritten in the buffer 228 before the current image frame 402 is stored in the buffer 228. When the one or more preceding image frames is less than the predefined number of preceding image frames associated with the history sequence 404, a subset of preceding image frames are not stored in the buffer by themselves, while their weighted gray centroid values or shift distances are stored in the history sequence 404.

In some embodiments, the electronic device 200 includes a motion sensor 250 (e.g., an accelerometer, gyroscope, magnetometer) configured to capture motion data 406 (e.g., acceleration and rotation data) describing movement of the electronic device 200. The motion data 406 is used to determine (408) whether the electronic device 200 is stable physically. In accordance with a determination that that electronic device 200 is not stable (410) based on the motion data 406, the history sequence 404 is erased (412) from the buffer 228. Conversely, in accordance with a determination that that electronic device 200 is stable (414) based on the motion data 406, the gray centroid values and shift distances are determined (416) for the current image frame 402, while the gray centroid values or and shift distances for a subset or all of the predefined number of preceding image frames may have already been stored in the history sequence 404. A shift distance of the current image frame 402 (e.g., a first shift distance of an ROI 102 or a spatially weighted shift distance) is compared to a shift threshold $SD_{TH}$ that is optionally updated (418). In accordance with a determination that the shift distance of the current image frame 402 exceeds (420) the shift threshold $SD_{TH}$, the electronic device 200 determines that a highlight moment initiates at the current image frame 402 and enables (422) slow-motion recording of a corresponding highlight moment, i.e., a set of highlight images starting from the current image frame 402 or an image frame near it are stored in the memory 206 in association with the highlight moment. Conversely, in accordance with a determination that the shift distance of the current image frame 402 does not exceed (424) the shift threshold $SD_{TH}$, the electronic device 200 stores (426) the gray centroid values or shift distances in the history sequence 404 in the buffer 228, and continues to capture and process (428) a subsequent image frame as the current image frame 402. More details on the gray centroid values of the current image frame 402 are discussed below with reference to FIG. 5 and FIGS. 6A-6B.

When the electronic device 200 determines that the highlight moment initiates at the current image frame 402, the electronic device 200, in some implementations, records the highlight moments starting from the current image frame 402, a predefined number of image frames preceding the current image frame 402, or a predefined number of image frames subsequent to the current image frame 402. In some embodiments, the buffer 228 only stores the current image frame 402, and the highlight moments is recorded from the current image frame 402 and stored in the data storage 230 for subsequent review. Alternatively, in some embodiments, the buffer 228 stores the current image frame 402 and the predefined number of image frames preceding the current image frame 402, and the highlight moments is retroactively recorded from the predefined number of image frames preceding the current image frame 402 and stored in the data storage 230 for subsequent review. Alternatively, in some embodiments, the buffer 228 stores the current image frame 402 and the predefined number of image frames subsequent to the current image frame 402, and the highlight moments is forward recorded from the predefined number of image frames subsequent to the current image frame 402 and stored in the data storage 230 for subsequent review.

Figure 5:
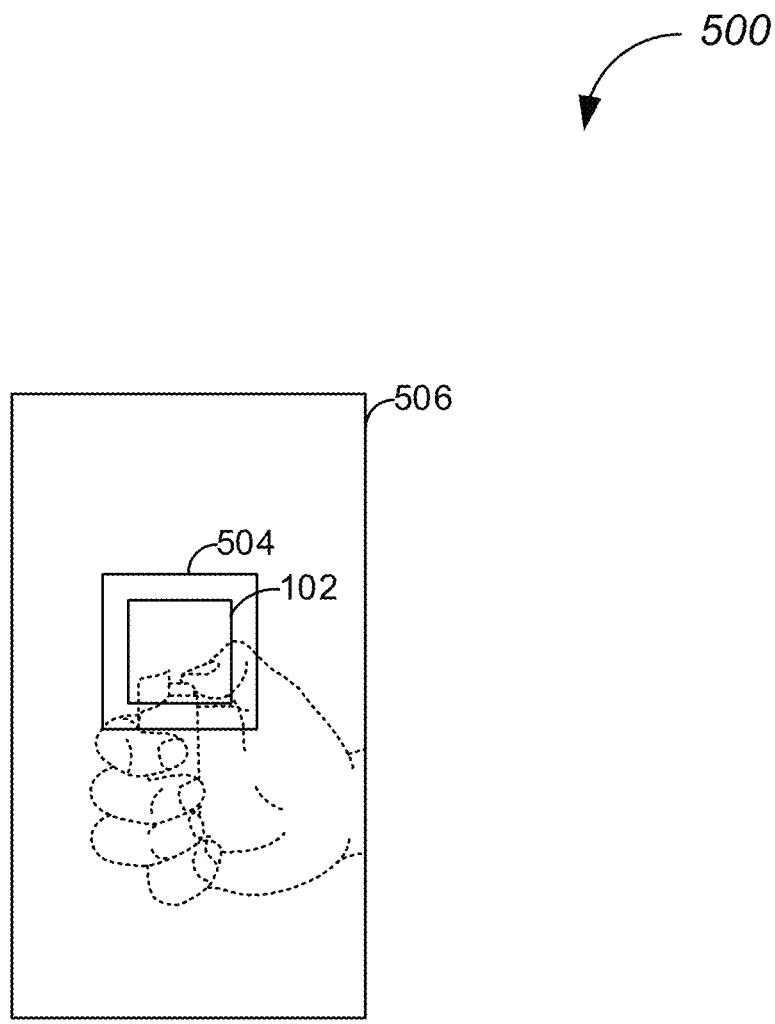
FIG. 5 illustrates a plurality of regions defined in a sequence of image frames for highlight moment detection, in accordance with some embodiments.

FIG. 5 illustrates a plurality of regions 500 defined in a sequence of image frames for highlight moment detection, in accordance with some embodiments. The plurality of regions 500 includes an ROI 102, a neighboring region 504, and a global region 506. In each image frame, the neighboring region 504 encloses the ROI 102, and the global region 506 covers an entire image and encloses the neighboring region 504. The highlight moments are detected with respect to the ROI 102 in a field of view of a camera of the electronic device 200. The neighboring region 504 is used to detect an object approaching the ROI 102, and the global region 506 is used to check whether there are global jitters. For each image frame, each of the plurality of regions has a gray centroid corresponding to a center of mass of the respective region calculated based on gray levels of pixels in the respective region. For each type of regions across the sequence of image frames, the respective gray centroid is evaluated in a weighted manner to detect an initiation of a highlight moment and trigger slow-motion video recording based on a shift threshold $SD_{TH}$.

In some embodiments, the ROI 102 is marked in an optical viewfinder or on a screen of the electronic device 200. The ROI 102 is, in some implementations, predefined for the electronic device 200. The ROI 102 can be defined or adjusted by a user of the electronic device 200 in some embodiments. For example, the screen of electronic device 200 includes a touch screen for receiving user actions (e.g., clicks, swipes and strokes) intended to define or adjust a position, shape and size of the ROI 102. In some embodiments, the neighboring region 504 is automatically determined based on the ROI 102. For example, the neighboring region 504 has the same shape as the ROI 102, and each dimension of the neighboring region 504 is the multiple such as 1.5 times of the respective dimension of the ROI 102.

Figure 6A:
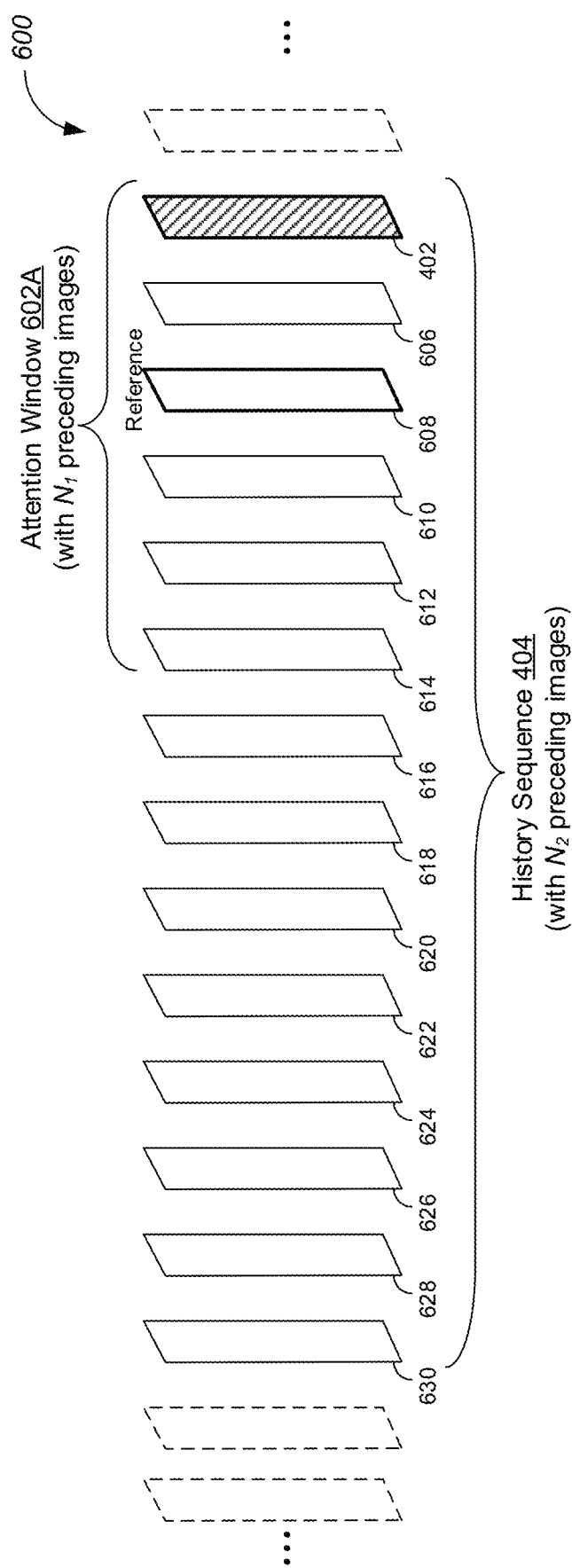
FIG. 6A illustrates a sequence of image frames, in accordance with some embodiments.
Figure 6B:
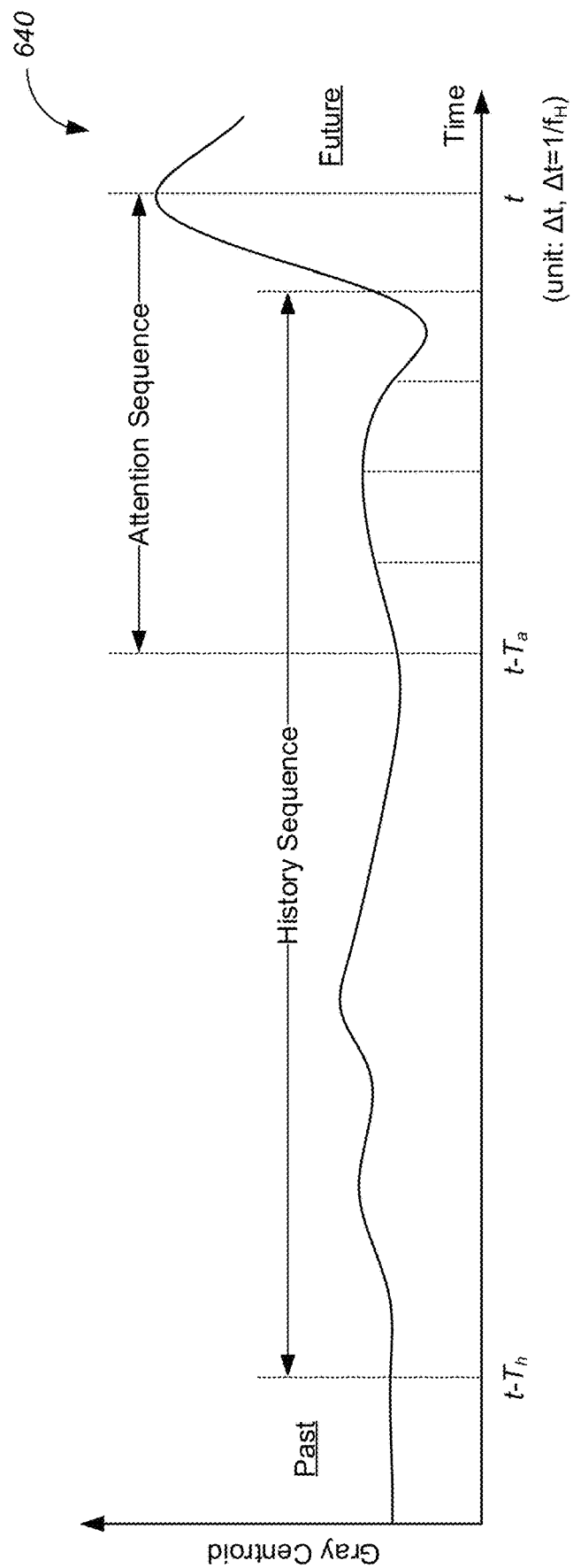
FIG. 6B is a time diagram of a gray centroid of a ROI of each image frame in the sequence of image frames, in accordance with some embodiments.
Figure 6C:
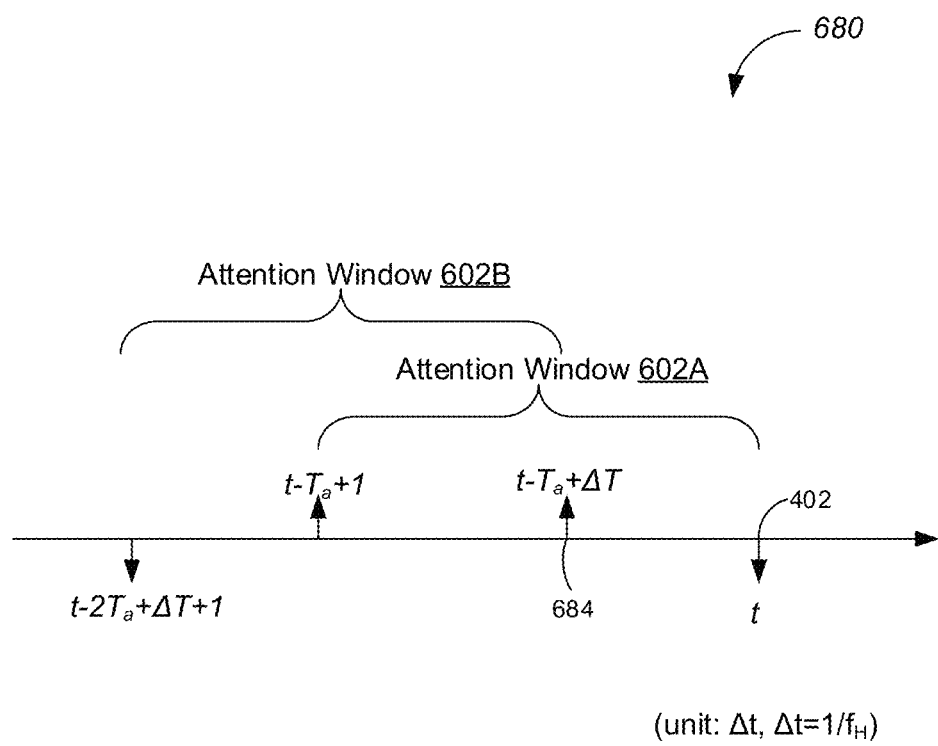
FIG. 6C illustrates a temporal relationship of attention windows applied to detect an initiation of a highlight moment, in accordance with some embodiments.

FIG. 6A illustrates a sequence of image frames 600, in accordance with some embodiments, and FIG. 6B is a time diagram 640 of a gray centroid of a ROI of each image frame in the sequence of image frames 600 (i.e., a history sequence 404 corresponding to the sequence of image frames 600), in accordance with some embodiments. FIG. 6C illustrates a temporal relationship 680 of attention windows 602A and 602B applied to detect an initiation of a highlight moment, in accordance with some embodiments. Multiscale spatial regions (e.g., regions 102, 504 and 506) are used to detect a moving object appears within or approaching the ROI 102 in the sequence of image frames 600. Multiscale time windows (e.g., attention windows 602) are used to adaptively detect highlight moments that occur at different speeds. A spatially weighted shift distance V(t) is, in some implementations, calculated based on gray centroids of the multiscale spatial regions 102, 504 and/or 506 that are weighted over attention windows 602. A shift distance $SD^R$ of the ROIs 502 or the spatially weighted shift distance is compared with a shift threshold $SD_{TH}$ to determine whether there is a moving object within or approaching the ROI 102. In some embodiments, the shift threshold $SD_{TH}$ is automatically and dynamically adjusted to be consistent with a moving rate of the object in the field of view of the camera.

Each image frame in the sequence of images 600 corresponds to an attention window 602 covering the respective image frame and a first number of preceding image frames that are captured immediately prior to the respective image frame. The history sequence 404 corresponds to the current image frame 402 that is recently captured and a second predefined number of preceding image frames that are captured immediately prior to the current image frame 402, and covers a history window $T_h$. Each image frame in the sequence of images 600 includes a ROI 102, and the ROI 102 has a gray centroid corresponding to a center of mass of the ROI 102 calculated based on gray levels of pixels in the ROI 102. Specifically, the gray centroid $(X_C^R, y_C^R)$ of the ROI 102(R) of an image frame 402 captured at a time t is defined as:

$$x_c^R(t) = \sum_{k=1}^{H} \sum_{y=1}^{W} x \cdot I(x, y) \Big/ \sum_{k=1}^{H} \sum_{y=1}^{W} I(x, y) \quad (1)$$

$$y_c^R(t) = \sum_{k=1}^{H} \sum_{y=1}^{W} y \cdot I(x, y) \Big/ \sum_{k=1}^{H} \sum_{y=1}^{W} I(x, y) \quad (2)$$

where I(i, j) is a gray intensity of a pixel at position (i, j) of the image frame 402, and H and W are height and width of the ROI 102, respectively.

The image frame 402 corresponds to an attention window 602A covering the image frame 402 and the first number of preceding image frames captured immediately prior to the image frame 402. For example, the attention window 602A includes the image frame 402 and 5 preceding image frames. The attention window 602A covers a duration of time $T_a$ (also called a length $T_a$). Given that the image frames are captured at a high frame rate $f_H$, the duration of time $T_a$ covers an integer number of periods corresponding to the high frame rate $f_H$. For example, the duration $T_a$ is equal to 5Δt, where Δt is a frame time between two consecutive frames and equal to $I/f_H$. A temporally weighted gray centroid $(X_C^R, Y_C^R)$ of the ROI 102 (R) is determined for the image frame 402 as a temporally weighted combination of gray centroids of the ROIs of all of the image frames in the attention window 602A that covers the duration of time $T_a$ (e.g., spanning from $t-T_a+1$ to t) as follows:

$$X_c^R(t) = W_X \cdot X = \sum_{i=0}^{T_a-1} w_i^x * x_c^R(t-i) \quad (3)$$

$$Y_c^R(t) = W_Y \cdot Y = \sum_{i=0}^{T_a-1} w_i^y * y_c^R(t-i) \quad (4)$$

where $W_x$ and $W_y$ are two weight vectors representing x-axis weights and y-axis weights for combining the gray centroids of the ROIs of all of the image frames in the attention window 602A. Specifically, the weight vectors $W_x$ and $W_y$ are represented as $[W_0^X, W_1^X, \ldots, W_{T_a}^X-1]$ and $[W_0^Y, W_1^Y, \ldots, W_{T_a}^Y-1]$, respectively. Each of the weight vectors $W_x$ and $W_y$ is normalized, so $\|W_x\|=1$ and $\|W_y\|=1$. For the image frames in the attention window 602A, the weights in the weight vectors $W_x$ and $W_y$ have the following relationships:

$$W_0^X > W_1^X > \ldots > W_{T_a-1}^X, W_0^Y > W_1^Y > \ldots > W_{T_a-1}^Y. \quad (5)$$

Referring to FIG. 6C, a first shift distance $SD^R$ is determined between the ROIs 102 of two adjacent image frames 402 and 684 corresponding to two adjacent attention windows 602A and 602B that have an overlapping time window ΔT. The image frame 402 corresponds to a first attention window 602A that spans from $t-T_a+1$ to t. The image frame 684 precedes and is a reference image frame of the image frame 402, and corresponds to a second attention window 602B that starts before the first attention window 602A and spans from $t-2*T_a+\Delta T+1$ to $t-T_a+\Delta T$. An example of the reference image frame for the image frame 402 is the image frame 608, and the corresponding overlapping time window is 2Δt. In an example, the overlapping time window ΔT and the length of the attention windows 602A and 602B have a predefined ratio, e.g., 2/3. The first shift distance $SD^R$ of the ROIs 102 between the image frame 402 and corresponding reference image frame 684 is represented as follows:

$$SD^R(t) = \sqrt{[X_c^R(t) - X_c^R(t - T_a + \Delta T)]^2 + [Y_c^R(t) - Y_c^R(t - T_a + \Delta T)]^2}. \quad (6)$$

In some embodiments, a second temporally weighted gray centroid $(X_C^N, Y_C^N)$ of the neighboring regions 504 is determined for the image frame 402 as a temporally weighted combination of gray centroids $(X_c^N, Y_C^N)$ of the neighboring regions 504 of all of the image frames in the attention window 602A. A second shift distance $SD^N$ of the neighboring regions 504 between the image frame 402 and corresponding reference image frame 684 is represented as follows:

$$SD^N(t) = \sqrt{[X_c^N(t) - X_c^N(t - T_a + \Delta T)]^2 + [Y_c^N(t) - Y_c^N(t - T_a + \Delta T)]^2}. \quad (7)$$

A third temporally weighted gray centroid $(X_c^G, Y_C^G)$ of the global regions 506 is determined for the image frame 402 as a temporally weighted combination of gray centroids $(X_c^G, Y_C^G)$ of the global regions 506 of all of the image frames in the attention window 602A. A third shift distance $SD^G$ of the global regions 506 between the image frame 402 and corresponding reference image frame 684 is represented as follows:

$$SD^G(t) = \sqrt{[X_c^G(t) - X_C^G(t - T_a + \Delta T)]^2 + [Y_c^G(t) - Y_c^G(t - T_a + \Delta T)]^2}. \quad (8)$$

A spatially weighted shift distance y(t) is determined for the image frame 402 and corresponding reference image frame 684 based on a weighted combination of the first shift distance $SD^R$ of the ROIs 102, the second shift distance $SD^N$ of the neighboring regions 504, and the third shift distance $SD^G$ of the global regions 506 as follows:

$$v(t) = a_1 * SD^R(t) + a_2 * SD^N(t) + a_3 * SD^G(t) \quad (9)$$

wherein $a_1$, $a_2$ and $a_3$ are coefficients to combine the first, second and third shift distances. In some embodiments, the coefficient $a_3$ is negative, and the coefficients are as follows:

$$a_1 > a_2 > |a_3| > 0 > a_3 \quad (10)$$

As such, based on the coefficients $a_2$ and $a_3$, the neighboring region 504 is considered for detecting an initiation of a highlight moment related to the ROI 102, and the global region 506 is also considered for counteracting global jitters (i.e., to remove global jitters incorporated into the first shift distance associated with the ROIs). It is noted that, in some implementations, various times (e.g., t, $T_a$, $T_h$, ΔT) are measured in the frame time Δt.

For each image frame in the sequence of images 600, the spatially weighted shift distance y(t) is compared with a respective shift threshold $SD_{TH}(t)$. In some embodiments, for the current image frame 402, in accordance with a determination that the shift distance y(t) of the image frame 402 is greater than the shift threshold $SD_{TH}(t)$, the current image frame 402 is identified as an initial image of a highlight moment, and slow-motion video recording is triggered. Conversely, in accordance with a determination that the shift distance y(t) of the image frame 402 is less than the shift threshold $SD_{TH}(t)$, the current image frame 402 is not identified as an initial image of a highlight moment, nor is slow-motion video recording triggered. In some situations, a subset of the gray centroids (xc, yc), temporally weighted gray centroids (Xc, Xc), shift distances of the ROIs 102, neighboring regions 504 and global regions 506, and a spatially weighted shift distance y(t) of the image frame 402 are stored in the history sequence 404, independently of whether the image frame 402 is identified as the initial image of the highlight moment.

Additionally, in some embodiments, the shift threshold $SD_{TH}(t)$ is adaptively evolving with a local change of the highlight moments. Different highlight moments may occur at different speeds, and the shift threshold $SD_{TH}(t)$ is adjusted for each image frame as a weighted combination of a moving average of the spatially weighted shift distance y(t) over an extended time window (e.g., the history window $T_h$ corresponding to the history sequence 404) and one or more standard deviations of the spatially weighted shift distance y(t) over one or more windows. In an example, the one or more standard deviations of the shift distance y(t) include a history standard deviation o-h that represents a standard deviation of the shift distance y(t) across all image frames in the history sequence. In an example, the standard deviations of the shift distance y(t) include an attention standard deviation $\sigma_a$ that represents a standard deviation of the shift distance y(t) across all image frames in the attention window (e.g., the window 602A). For example, the shift threshold $SD_{TH}(t)$ is adjusted for the image frame 402 as follows:

$$SD_{TH}(t) = \sum_{i=0}^{T_h} s_i * v(t-i) + b_1 * \sigma_h + b_2 * \sigma_a \quad (11)$$

where s is the weights associated with the spatially weighted shift distances, and $s_0 > s_1 > \ldots s_{T_h-1}$, and $b_1$ and $b_2$ are coefficients of the standard deviations $\sigma_h$ and $\sigma_a$. The standard deviations $\sigma_h$ and $\sigma_a$ are represented as follows:

$$\sigma_h = \sqrt{\frac{1}{N}\sum_{i=1}^{T_h}(V(t-i)-\mu_h)^2}, \mu_h = \frac{\sum_{i=1}^{T_h} v(t-i)}{T_h} \text{ and} \quad (12)$$

$$\sigma_a = \sqrt{\frac{1}{N}\sum_{i=0}^{T_a-1}(V(t-i)-\mu_a)^2}, \mu_a = \frac{\sum_{i=0}^{T_a-1} v(t-i)}{T_a}. \quad (13)$$

By these means, the initial image 402 can be detected promptly and accurately for a highlight moment having an object appears in or approaches the ROI with different moving speeds.

Alternatively, in some embodiments, the first shift distance $SD^R$ of the ROIs 102 between the image frames 402 and reference image frame 684 is used without considering an object entering the neighboring region 504 and the global jitters of the global region 506. For each image frame in the sequence of images 600, the first shift distance $SD^R$ is compared with the respective shift threshold $SD_{TH}$ to determine whether the respective image frame is an initial image of a highlight moment and whether slow-motion video recording needs to be triggered. A subset of the gray centroids (xc, yc), temporally weighted gray centroids (Xc, Xc), and first shift distance $SD^R$ of the ROIs 102 of the image frames 402 and 606-630 are stored in the history sequence 404. Further, in some embodiments, the shift threshold $SD_{TH}$ is adjusted for each image frame as a weighted combination of a moving average of the first shift distance $SD^R$ of the ROIs 102 over an extended time window (e.g., the history window $T_h$ corresponding to the history sequence 404) and one or more standard deviations of the first shift distance $SD^R$ (e.g., the history standard deviation $\sigma_h$ and attention standard deviation aa). For example, the shift threshold $SD_{TH}(t)$ is adjusted for the image frame 402 as follows:

$$SD_{TH}(t) = \sum_{i=0}^{T_h} s_i * SR^D(t-i) + b_1 * \sigma_h + b_2 * \sigma_a \quad (14)$$

The standard deviations $\sigma_h$ and $\sigma_a$ are represented as follows:

$$\sigma_h = \sqrt{\frac{1}{N}\sum_{i=1}^{T_h}(SD^R(t-i)-\mu_h)^2}, \mu_h = \frac{\sum_{i=1}^{T_h} SD^R(t-i)}{T_h} \text{ and} \quad (15)$$

$$\sigma_a = \sqrt{\frac{1}{N}\sum_{i=0}^{T_a-1}(SD^R(t-i)-\mu_a)^2}, \mu_a = \frac{\sum_{i=0}^{T_a-1} SD^R(t-i)}{T_a}. \quad (16)$$

Figure 7:
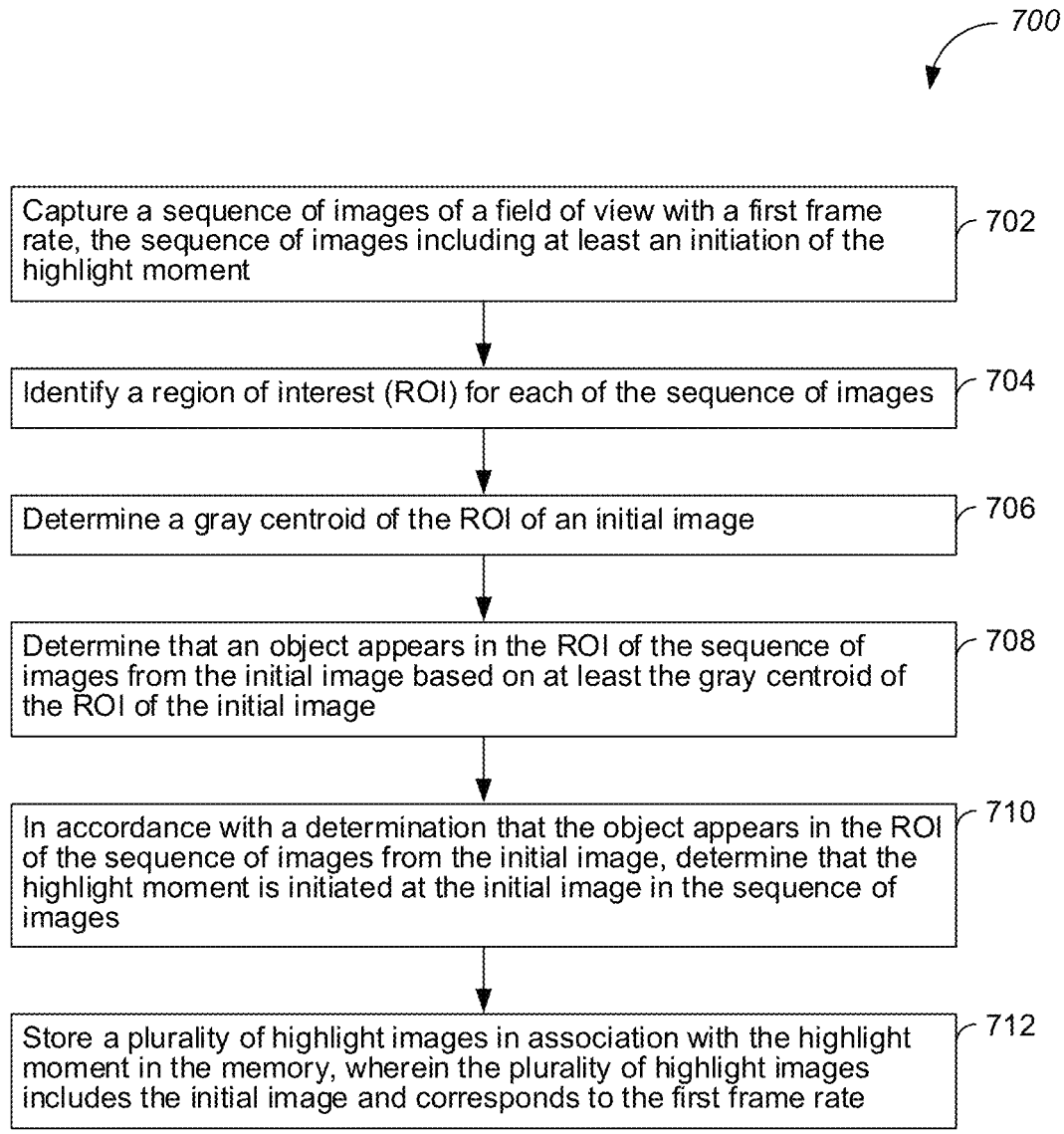
FIG. 7 is a flow diagram of a highlight moment detection method implemented at an electronic device, in accordance with some embodiments.

FIG. 7 is a flow diagram of a highlight moment detection method 700 implemented at an electronic device 200, in accordance with some embodiments. The method 700 is, in some implementations, governed by instructions that are stored in a non-transitory computer readable storage medium and that are executed by one or more processors of the electronic device 200. Each of the operations shown in FIG. 7 may correspond to instructions stored in the computer memory or computer readable storage medium (e.g., memory 206 in FIG. 1) of the electronic device 200. The computer readable storage medium may include a magnetic or optical disk storage device, solid state storage devices such as Flash memory, or other non-volatile memory device or devices. The computer readable instructions stored on the computer readable storage medium may include one or more of: source code, assembly language code, object code, or other instruction format that is interpreted by one or more processors. Some operations in method 700 may be combined and/or the order of some operations may be changed.

The electronic device captures (702) a sequence of images of a field of view with a first frame rate. The sequence of images includes at least an initiation of the highlight moment. The electronic device 200 identifies (704) an ROI 102 for each of the sequence of images and determines (706) a gray centroid of the ROI 102 of an initial image 402. In some situations, a user input is received for identifying the ROI 102 prior to or during the course of capturing the sequence of images. The electronic device 200 determines (708) that an object appears in the ROI 102 of the sequence of images from the initial image 402 based on at least the gray centroid of the ROI 102 of the initial image 402. In some embodiments, the object is determined to appear in the ROI 102 of the sequence of images from the initial image 402 based on a gray centroid of a neighboring region 504 of the initial image 402 and/or a gray centroid of an entire image 506 of the initial image 402. The neighboring region 504 encloses the ROI 102 of the initial image 402. For convenience of reference, we assume that the image frame 402 in FIG. 6A is determined as the initial image of the highlight moment.

In some embodiments, the electronic device 200 measures a stability level of the electronic device 200 using a motion sensor 250. The initial image 402 is determined to initiate the highlight moment in the sequence of images in accordance with a determination that the stability level of the electronic device 200 exceeds a stability threshold. More details on stability-based highlight moment detection are discussed above with reference to FIG. 4.

In accordance with a determination that the object appears in the ROI 102 of the sequence of images from the initial image 402, the electronic device determines (710) that the highlight moment is initiated at the initial image 402 in the sequence of images and stores (712) a plurality of highlight images in association with the highlight moment in the memory 206 (specifically, in the data storage 230). The plurality of highlight images includes the initial image 402 and corresponds to the first frame rate. In some embodiments, the plurality of highlight images are played back at a second frame rate that is slower than the first frame rate, such that the highlight moment is reviewed in slow motion. For example, the first frame rate is greater than 100 frames per second (FPS), and the second frame rate is less than 50 FPS. In a specific example, the first frame rate is 240 FPS, and the second frame rate is 24 FPS. In some embodiments, the plurality of highlight images are started with the initial image 402 or a first preceding image that precedes the initial image 402 and is separated from the initial image by a first number of dummy image frames. Further, in some embodiments, the first preceding image and the first number of dummy image frames are cached in the buffer 228, and subsequently copied to the memory (e.g., the data storage 230) after the highlight moment is determined to be imitated at the initial image 402. More details on storing the highlight images associated with the highlight moment are explained above with reference to FIGS. 1A and 1B.

In some embodiments, referring to FIGS. 6A-6C, a first number of preceding images 606-614 are captured immediately prior to the initial image 402 and in an initial attention window 602A of the initial image 402. For each of the first number of preceding images 606-614, a gray centroid of the ROI 102 of the respective preceding image is determined. The electronic device 200 also determines a temporally weighted gray centroid of the initial image 402 based on a temporally weighted combination of the gray centroid of the ROI 102 of the initial image 402 and the gray centroids of the ROIs 102 of the first number of preceding images 606-614. Further, in some embodiments, the first number of preceding images 606-614 includes a reference image 684 (e.g., the image 608). For each of the first number of preceding images 606-614, the electronic device 200 determines a temporally weighted gray centroid of the ROI of the respective preceding image. A first shift distance $SD^R$ of the temporally weighted gray centroid of the ROI 102 of the initial image 402 is determined with reference to the temporally weighted gray centroid of the ROI 102 of the reference image 684. Additionally, in some embodiments, the reference image 684 has a reference attention window 602B that covers the reference image 684 and the first number of preceding images that are captured immediately prior to the reference image 684, and the reference attention window 602B overlaps the initial attention window 602A with an overlapping window ΔT. A ratio of the overlapping window and the initial attention window is greater than a predefined overlap threshold (e.g., ½). In an example, the ratio is equal to 2/3.

Additionally, in some embodiments, after identifying a neighboring region 504 for the RIO 102 of each of the sequence of images, the electronic device determines a second shift distance $SD^N$ of a temporally weighted gray centroid of the neighboring region 504 of the initial image 402 with reference to the temporally weighted gray centroid of the neighboring region 504 of the reference image 684, and a third shift distance $SD^G$ of a temporally weighted gray centroid of an entire region of the initial image 402 with reference to the temporally weighted gray centroid of an entire region of the reference image 684. The electronic device 200 further determines a spatially weighted shift distance y(t) of the initial image 402 based on a spatially weighted combination of the first, second and third shift distances of the initial image 402.

In some embodiments, the spatially weighted shift distance y(t) of the initial image 402 satisfies a moment initiation condition, such that the initial image 402 is identified among the sequence of images as initiating the highlight moment. In accordance with the moment initiation condition, the spatially weighted shift distance y(t) of the initial image 402 exceeds a shift threshold $SD_{TH}$ that indicating that an object appears in the ROI of the initial image. Further, in some embodiments, the initial image 402 corresponds to a history sequence 404 including a second number of preceding images 606-630 that are captured immediately prior to the initial image 402. The second number is greater than the first number. For each the second number of preceding images 606-630, a spatially weighted shift distance of the respective preceding image is determined. The electronic device 200 determines a first standard deviation a, of a first set of spatially weighted shift distances of the first number of preceding images 606-614 and a second standard deviation a, of a second set of spatially weighted shift distances of the second number of preceding images 606-630. The shift threshold $SD_{TH}$ is dynamically updated for the initial image 402 based on a weighted combination of the spatially weighted shift distance of the second number of preceding images 606-630, the first standard deviation $\sigma_a$, and the second standard deviation $\sigma_b$. The second number of preceding images 606-630 are weighted based on a temporal distance from the initial image, e.g., their corresponding weights go down as the temporal distance from the initial image 402 increases.

In some embodiments, information of a subset of images in the sequence of images is cached in the buffer 228 of the electronic device 200. Further, in some embodiments, the information of the subset of images includes the initial image and a predefined number of preceding images that are captured immediately prior to the initial image. The information of the subset of images cached in the buffer also includes a first gray centroid of the ROI, a second gray centroid of a neighboring region enclosing the ROI, and a third gray centroid of an entire region of each of the subset of images. In some embodiments, the subset of images includes more images in addition to the initial image and the predefined number of preceding images. Only the predefined number of images are stored because each image has a relatively large size and the buffer has a limited capacity for storing each image by itself. In some embodiments, the information of the subset of images cached in the buffer further includes one or more of: a temporally weighted first gray centroid and a first shift distance of the ROI 102, a temporally weighted second gray centroid and a second shift distance of the neighboring region 504, a temporally weighted third gray centroid and a third shift distance of the entire region, and a spatially weighted shift distance y(t) of each of the subset of images.

In some embodiments, the first frame rate corresponds to a frame time Δt, and the initial image 402 is identified within the frame time from the initial image being captured. For each of one or more preceding images that are captured prior to the initial image 402, the electronic device 200 determines that the highlight moment is not initiated from the respective preceding image within the frame time Δt from capturing the respective preceding image, purges the respective preceding image from the buffer 228, and aborts storing the respective preceding image in the memory 206 (specifically, the data storage 230). Detection of the initiation of the highlight moment is completed for each image before a next image is captured. In some embodiments, each image is processed entirely locally and without using any deep learning technique.

In some embodiments, the electronic device 200 identifies a final image that terminates the highlight moment in the sequence of images. Specifically, the electronic device 200 determines a gray centroid of the ROI of the final image and that an object disappears from the ROI of the sequence of images from the final image based on at least the gray centroid of the ROI of the final image. The plurality of highlight images is ended with the final image or a subsequent image that follows the final image and is separated from the final image by a second number of dummy image frames. Alternatively, in some embodiments, the plurality of highlight images includes a predefined number of image frames. More details on detecting an end of the highlight moment are discussed above with reference to FIGS. 1A and 1B.

In some embodiments, the highlight moment detection method 700 is applied in a mobile device to monitor, detect and trigger slow-motion video recording. In the highlight moment detection method 700, each image frame is evaluated at an ultrafast speed (e.g., within 3 ms), which is at least 10 times faster than traditional moving object detection methods that optionally rely on and are slowed down by a deep learning technique. The method 700 prompts a response to a local sudden change with an adaptively adjusted threshold $SD_{TH}$. Based on the ultrafast detection speed and the adaptively adjusted threshold, every video frame is evaluated on whether or not to trigger slow-motion video recording to enable detection of the initiation of the highlight moment and triggering of slow-motion recording in a prompt and accurate manner.

In the highlight moment detection method 700, a shift distance of a gray centroid of an ROI is used to determine whether there is a moving object within or approaching the ROI 102 of each image frame. Specifically, the shift distances of gray centroids are evaluated at multiple spatial regions (e.g., the ROI 102, neighboring region 504, and global region 506). The ROI 102 is used to detect fast movement happens therein. The neighbor region 504 encloses the ROI 102 and is used to detect any new object approaching fast to the ROI 102. The global region 506 is used to check if there are global jitters. A plurality of shift distances are combined in a weighted manner and compared with the threshold $SD_{TH}(t)$. If the weighted shift distance is larger than the threshold $SD_{TH}(t)$, the electronic device 200 starts to record a set of image frames associated with the highlight moments, and the set of image frames are configured to be reviewed in slow motion.

In some embodiments of this disclosure, a multiscale time window is used to adaptively detect various moments that may occur at different speeds. The gray centroid is evaluated and weighted over an attention window, and the shift distance is compared between two image frames having adjacent attention windows that at least partially overlap. The shift threshold $SD_{TH}$ compared with the shift distance is also adaptively evolving. In some embodiments, to account for various moments that occur at different speeds, the shift threshold $SD_{TH}$ is weighted as a combination of a moving average of shift distance over a history sequence and one or more standard deviation (e.g., a standard deviation of the shift distance over an attention window). By these means, the highlight moment detection method 700 can respond to multiple moving speeds that happen within or approaching the ROI 102 without presetting the shift threshold $SD_{TH}$.

It should be understood that the particular order in which the operations in FIG. 7 have been described are merely exemplary and are not intended to indicate that the described order is the only order in which the operations could be performed. One of ordinary skill in the art would recognize various ways to cache and distribute specific data as described herein. Additionally, it should be noted that details described above with respect to FIG. 1A to FIG. 6 are also applicable in an analogous manner to the process 700 described above with respect to FIG. 7. For brevity, these details are not repeated here.

The present disclosure describes embodiments related to an automatic highlight moment detection method that triggers recording of slow-motion video data associated with a highlight moment. In this highlight moment detection method, each image frame is evaluated at an ultrafast speed (e.g., <3 ms) to determine whether the respective image frame is associated with an initiation of the highlight moment, such that recording of the highlight moment can be initiated in a timely manner (e.g., within several milliseconds of the initiation of the highlight moment). In some embodiments, this ultrafast speed of frame evaluation is made available because this highlight moment detection method is implemented locally at an electronic device having a camera for capturing the video data and does not involve any deep learning algorithms.

In one or more examples, the functions described may be implemented in hardware, software, firmware, or any combination thereof. If implemented in software, the functions may be stored on or transmitted over, as one or more instructions or codes, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, codes and/or data structures for implementation of the embodiments described in the present disclosure. A computer program product may include a computer-readable medium.

The terminology used in the description of the embodiments herein is for the purpose of describing particular embodiments only and is not intended to limit the scope of claims. As used in the description of the embodiments and the appended claims, the singular forms "a" "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, elements, and/or components, but do not preclude the presence or addition of one or more other features, elements, components, and/or groups thereof.

It will also be understood that, although the terms first, second, etc. may be used herein to describe various elements, these elements should not be limited by these terms. These terms are only used to distinguish one element from another. For example, a first electrode could be termed a second electrode, and, similarly, a second electrode could be termed a first electrode, without departing from the scope of the embodiments. The first electrode and the second electrode are both electrodes, but they are not the same electrode.

The description of the present disclosure has been presented for purposes of illustration and description, and is not intended to be exhaustive or limited to the invention in the form disclosed. Many modifications, variations, and alternative embodiments will be apparent to those of ordinary skill in the art having the benefit of the teachings presented in the foregoing descriptions and the associated drawings. The embodiment was chosen and described in order to best explain the principles of the invention, the practical disclosure, and to enable others skilled in the art to understand the invention for various embodiments and to best utilize the underlying principles and various embodiments with various modifications as are suited to the particular use contemplated. Therefore, it is to be understood that the scope of claims is not to be limited to the specific examples of the embodiments disclosed and that modifications and other embodiments are intended to be included within the scope of the appended claims.

What is claimed is:

1. A method for detecting a highlight moment, comprising:
    at an electronic device having one or more processors and a memory:
        capturing a sequence of images of a field of view with a first frame rate, the sequence of images including at least an initiation of the highlight moment;
        in response to determining, based on at least a gray centroid of a region of interest (ROI) of one image of the sequence of images, that an object appears in the ROI of the sequence of images from the one image, determining the one image as an initial image at which the highlight moment is initiated; and
        storing, in the memory, a plurality of highlight images in association with the highlight moment, wherein the plurality of highlight images include the initial image and correspond to the first frame rate;
    wherein a first number of preceding images are captured immediately prior to the initial image and in an initial attention window of the initial image, and the method further comprises:
        for each of the first number of preceding images, determining a gray centroid of the ROI of the respective preceding image; and
        determining a temporally weighted gray centroid of the initial image, based on a temporally weighted combination of the gray centroid of the ROI of the initial image and the gray centroid of the ROIs of the first number of preceding images.

2. The method of claim 1, wherein determining that the object appears in the ROI of the sequence of images from the initial image is further based on a gray centroid of a neighboring region of the initial image or a gray centroid of an entire region of the initial image, the neighboring region enclosing the ROI of the initial image, and each of the ROI, the neighboring region and the entire region has a gray centroid corresponding to a center of mass of the respective region calculated based on gray levels of pixels in the respective region.

3. The method of claim 1, wherein the first number of preceding images includes a reference image, and the method further comprises:
    for each of the first number of preceding images, determining a temporally weighted gray centroid of the ROI of the respective preceding image; and
    determining a first shift distance of the temporally weighted gray centroid of the ROI of the initial image with reference to the temporally weighted gray centroid of the ROI of the reference image.

4. The method of claim 3, wherein the reference image has a reference attention window that covers the reference image and the first number of preceding images that are captured immediately prior to the reference image, and the reference attention window overlaps the initial attention window with an overlapping window, a ratio of the overlapping window and the initial attention window being greater than a predefined overlap threshold.

5. The method of claim 3, further comprising:
    identifying a neighboring region for the ROI of each of the sequence of images;
    determining a second shift distance of a temporally weighted gray centroid of the neighboring region of the initial image with reference to a temporally weighted gray centroid of the neighboring region of the reference image;
    determining a third shift distance of a temporally weighted gray centroid of an entire region of the initial image with reference to a temporally weighted gray centroid of an entire region of the reference image; and
    determining a spatially weighted shift distance of the initial image, based on a spatially weighted combination of the first shift distance, the second shift distance and the third shift distance of the initial image.

6. The method of claim 5, wherein determining that the object appears in the ROI of the sequence of images from the one image further comprises:
    in response to determining that the spatially weighted shift distance of the one image satisfies a moment initiation condition, identifying the one image among the sequence of images as initiating the highlight moment;
    wherein determining the moment initiation condition being satisfied comprises: determining that the spatially weighted shift distance of the one image exceeds a shift threshold indicating that an object appears in the ROI of the one image.

7. The method of claim 6, wherein the initial image corresponds to a history sequence including a second number of preceding images that are captured immediately prior to the initial image, the second number is greater than the first number, and the method further comprises:
    for each the second number of preceding images, determining a spatially weighted shift distance of the respective preceding image;

determining a first standard deviation of a first set of spatially weighted shift distances of the first number of preceding images;

determining a second standard deviation of a second set of spatially weighted shift distances of the second number of preceding images; and dynamically updating the shift threshold for the initial image, based on a weighted combination of the spatially weighted shift distances of the second number of preceding images, the first standard deviation, and the second standard deviation, wherein the second number of preceding images are weighted based on a temporal distance from the initial image.

8. The method of claim 1, further comprising:

caching, in a buffer of the electronic device, information of a subset of images in the sequence of images;

wherein the information of the subset of images includes the initial image, a predefined number of preceding images that are captured immediately prior to the initial image, and a first gray centroid of the ROI, a second gray centroid of a neighboring region enclosing the ROI, and a third gray centroid of an entire region of each of the subset of images.

9. The method of claim 8, wherein the information of the subset of images cached in the buffer further comprises one or more of: a temporally weighted first gray centroid and a first shift distance of the ROI, a temporally weighted second gray centroid and a second shift distance of the neighboring region, a temporally weighted third gray centroid and a third shift distance of the entire region, and a spatially weighted shift distance of an entire region of each of the subset of images.

10. The method of claim 1, wherein the plurality of highlight images is started with the initial image, or a first preceding image that precedes the initial image and is separated from the initial image by a first number of dummy image frames; and the method further comprises:

caching the first preceding image and the first number of dummy image frames in the cache; and copying the first preceding image and the first number of dummy image frames from the cache to the memory.

11. The method of claim 1, further comprising:

identifying a final image that terminates the highlight moment in the sequence of images, including:

determining, based on at least the gray centroid of the ROI of a further image of the sequence of images, that the object disappears from the ROI of the sequence of images from the further image, determining the further image as the final image;

wherein the plurality of highlight images is ended with the final image, or a subsequent image that follows the final image and is separated from the final image by a second number of dummy image frames.

12. The method of claim 1, wherein the plurality of highlight images includes a predefined number of image frames.

13. The method of claim 1, wherein the first frame rate corresponds to a frame time, and the initial image is identified within the frame time from the initial image being captured, and the method further comprises:

for each of one or more preceding images that are captured prior to the initial image:

determining that the highlight moment is not initiated from the respective preceding image within the frame time from capturing the respective preceding image;

purging the respective preceding image from a buffer; and aborting storing the respective preceding image in the memory.

14. The method of claim 1, further comprising:

receiving a user input for identifying the ROI prior to or during a course of capturing the sequence of images.

15. The method of claim 1, further comprising:

playing back the plurality of highlight images at a second frame rate that is slower than the first frame rate, such that the highlight moment is reviewed in slow motion.

16. The method of claim 15, wherein the first frame rate is greater than 100 frames per second (FPS), and the second frame rate is less than 50 FPS.

17. The method of claim 1, further comprising:

measuring a stability level of the electronic device using a motion sensor; wherein the initial image is determined to initiate the highlight moment in the sequence of images in accordance with a determination that the stability level of the electronic device exceeds a stability threshold.

18. An electronic device, comprising:

one or more processors; and a memory having instructions stored thereon, the instructions, when executed by the one or more processors, cause the processors to:

capture a sequence of images of a field of view at a first frame rate, the sequence of images comprising at least an initiation of a highlight moment, and the first frame rate exceeding a threshold frame rate;

in response to determining, based on at least a gray centroid of a region of interest (ROI) of one image of the sequence of images, that an object appears in the ROI of the sequence of images from the one image, determine the one image as an initial image of a highlight moment; and store, in the memory, a plurality of highlight images in association with the highlight moment, wherein the plurality of highlight images correspond to the first frame rate;

wherein determining that the object appears in the ROI of the sequence of images from the initial image is further based on a gray centroid of a neighboring region of the initial image or a gray centroid of an entire region of the initial image, the neighboring region enclosing the ROI of the initial image, and each of the ROI, the neighboring region and the entire region has a gray centroid corresponding to a center of mass of the respective region calculated based on gray levels of pixels in the respective region.

19. A non-transitory computer-readable medium, having instructions stored thereon, the instructions, when executed by one or more processors cause the processors to:

capture a sequence of images of a field of view at a first frame rate, the sequence of images comprising at least an initiation of a highlight moment, and the first frame rate exceeding a normal frame rate at which a video chip is recorded and reviewed;

in response to determining, based on at least a gray centroid of a region of interest (ROI) of one image of the sequence of images, that an object appears in the ROI of the sequence of images from the one image, determine the one image as an initial image of a highlight moment; and store, in a memory, a plurality of highlight images in association with the highlight moment, wherein the plurality of highlight images include the initial image and are captured at the first frame rate;

wherein the plurality of highlight images is started with the initial image, or a first preceding image that precedes the initial image and is separated from the initial image by a first number of dummy image frames; and the one or more processors are further caused to:

cache the first preceding image and the first number of dummy image frames in the cache; and copy the first preceding image and the first number of dummy image frames from the cache to the memory.

20. The electronic device of claim 18, wherein the one or more processors are further caused to:

cache, in a buffer of the electronic device, information of a subset of images in the sequence of images;

wherein the information of the subset of images includes the initial image, a predefined number of preceding images that are captured immediately prior to the initial image, and a first gray centroid of the ROI, a second gray centroid of the neighboring region enclosing the ROI, and a third gray centroid of the entire region of each of the subset of images.

* * * * *